May 6, 1958 J. J. BLACK 2,833,588
CARGO SUSPENSION STRUCTURE FOR ROAD VEHICLES
Filed Nov. 18, 1955 3 Sheets-Sheet 1
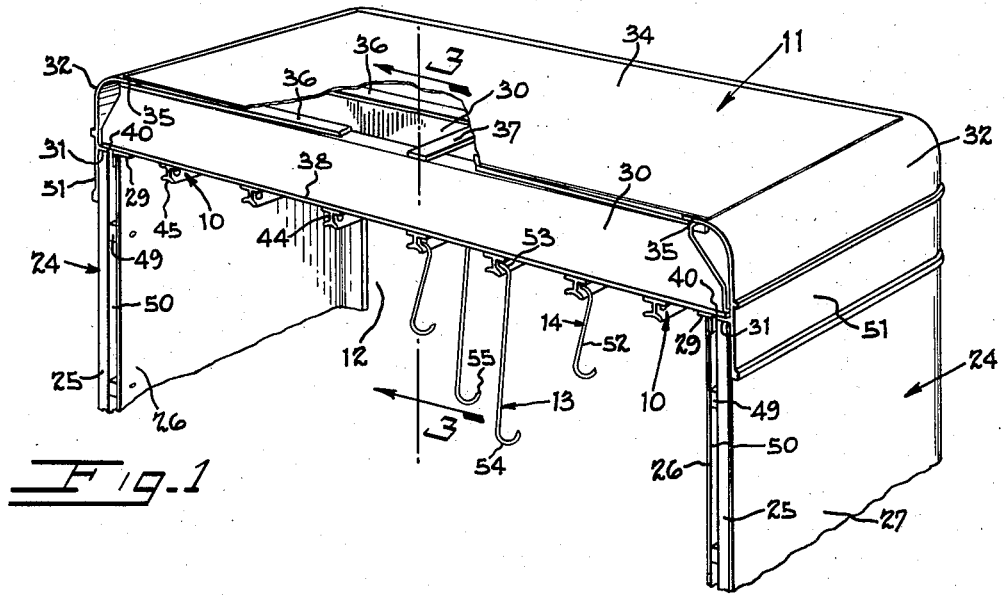
Fig. 1
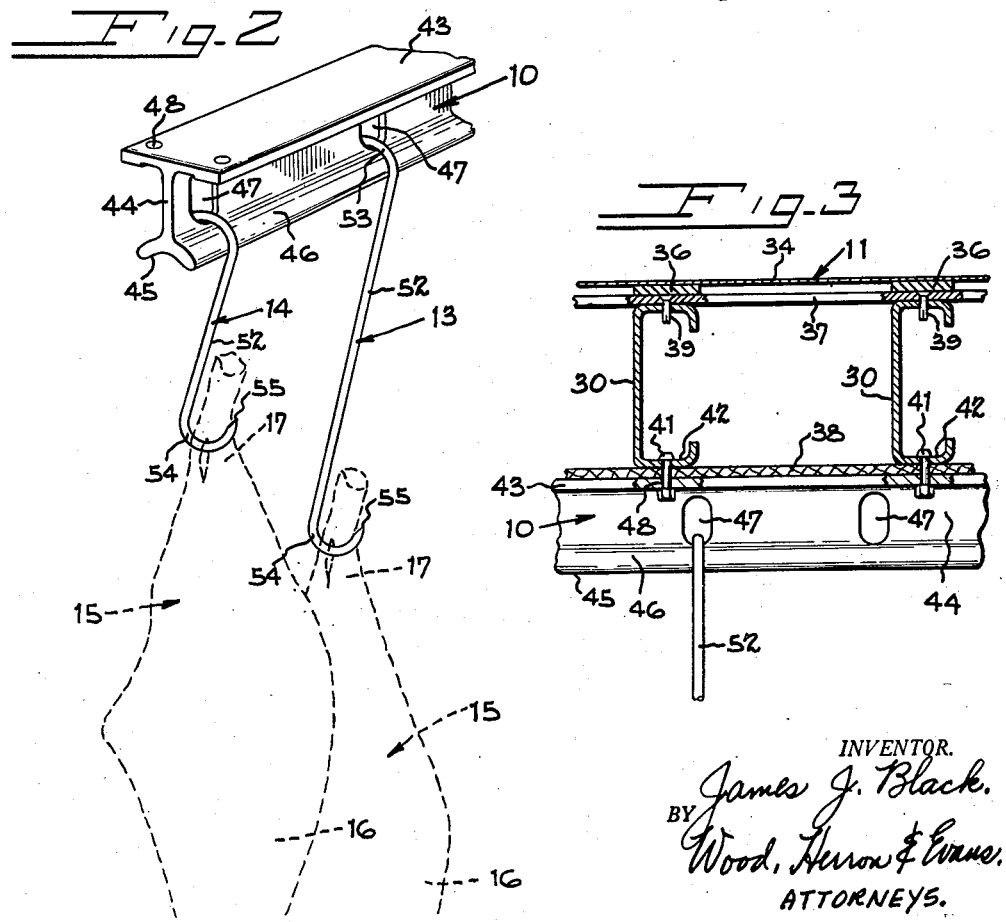
Fig. 2
Fig. 3
INVENTOR.
James J. Black.
BY
Wood, Herron & Evans.
ATTORNEYS.

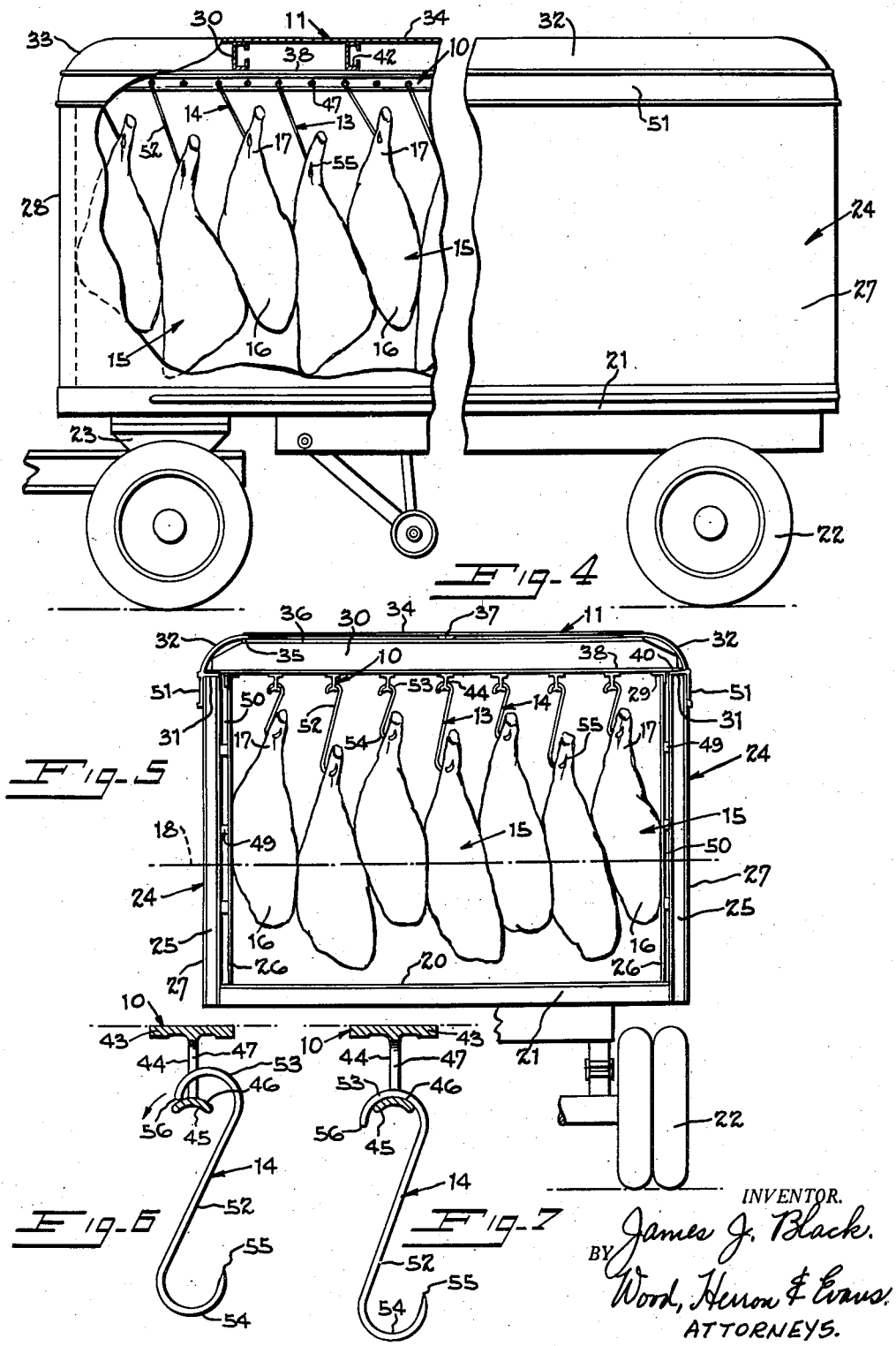

May 6, 1958 J. J. BLACK 2,833,588
CARGO SUSPENSION STRUCTURE FOR ROAD VEHICLES
Filed Nov. 18, 1955 3 Sheets-Sheet 3

INVENTOR.
James J. Black.
BY
Wood, Herron & Evans.
ATTORNEYS.

United States Patent Office 2,833,588
Patented May 6, 1958

2,833,588

CARGO SUSPENSION STRUCTURE FOR ROAD VEHICLES

James J. Black, Cincinnati, Ohio, assignor to Trailmobile, Inc., Cincinnati, Ohio, a corporation of Delaware Application November 18, 1955, Serial No. 547,735

9 Claims. (Cl. 296—28)

This invention relates to road vehicles such as trailers or semi-trailers which are adapted for highway transportation of meat in large quantities. For local hauling and delivery of meat sections, such as hind-quarters and forequarters of beef or the like, the pieces usually are stacked one upon another on the truck floor, and since the transportation period is short, no provision is usually required or provided for refrigeration of the meat. The present invention, however, contemplates a trailer or semi-trailer construction which is adapted for intercity or long distance transportation of meat in large quantities and which is equipped with one or more suitable refrigeration units, or packed with refrigerating material to maintain the meat at a suitably low temperature during transportation.

A principal objective of this invention has been to provide a construction wherein minimum heat loss is combined with maximum load carrying capacity at a reasonable cost of manufacture. Although meat intended to be transported over any substantial distance leaves the packing house at a suitably low temperature, still, if the haul is to occur over a long distance during warm weather, it is apparent that supplemental refrigeration during transportation will be required, and since the weight load of the meat being hauled is large, insulation to maintain a suitably low temperature within the vehicle is required or otherwise the size and cost of operation of the refrigeration unit will become prohibitive.

On the other hand, since meat shipped from a packing house usually is in the form of sides or quarters which are irregular in shape and cumbrous, it is apparent that provision must be made to carry the meat within the vehicle in such manner that each piece will occupy a minimum of space and will not be damaged physically during the course of transportation. Hence, the problem to which the present invention is addressed concerns the prevention of undue heat loss and the most effective use of available space while preventing damage to the merchandise in shipment.

The invention contemplates a trailer or semi-trailer structure having the usual load-sustaining chassis, side wall members extending upwardly from the chassis in spaced relationship to one another, a roof bridging the side walls, and suitable front and rear end closures bridging the side walls between the roof and chassis. However, in accordance with this invention, a maximum load of meat is sustained in a minimum of space and with minimum heat loss by a structure wherein cross rails or beams bridge the side wall structural members beneath the roof above one or more insulation panels of plywood or the like, while longitudinal suspension rails are mounted at the inner side of the insulation panel within the flat compartment of the vehicle. The longitudinal rails are provided with apertures at spaced intervals which are adapted to receive hangers or hooks on which the side or quarters of meat, as the case may be, are suspended, such that each hanger is held in a fixed position on the longitudinal rails.

There may be five or six of these longitudinal rails in spaced relationship to one another in the flat compartment of the vehicle from one side to the other, or as many as are required to accommodate the size of the meat sections which are to be transported, and the spacing of the apertures in each longitudinal rail is such that the sections of meat suspended on hangers anchored in the apertures will crowd against one another by virtue of their own weight rather than be suspended for free movement. Therefore, the meat during conveyance is maintained relatively in a state of compression, each piece crowding against the next so that longitudinal movement of a large weight with respect to each suspension rail during the starts and stops of transportation is prevented by the relative inertia of the whole of the mass suspended on each rail.

In the preferred practice of the invention, a roof structure is provided in which direct metal-to-metal conduction of heat from outside to inside is practically eliminated, utilizing the plywood ceiling panel as a heat insulating member. According to this principle, the meat rails are attached to the structural members of the roof by bolts or rivets, and since the panel is interposed between the two metallic structures, the only direct heat loss is through the attachment members which pass from the meat rails through the plywood panels to the cross rails of the roof structure. Since the metallic sections of the bolts are extremely small in relation to the total area of the meat rails and cross beams, the direct heat flow through them is quite small. However, this small loss may be eliminated, if desired, by staggering the bolts in such a way that one set joins the plywood ceiling panel to the cross beams while a second set joins the meat rails to the panel at points remote from the cross beams. This same construction principle may be utilized in the side wall structure as explained later.

The side walls of the structure are provided with insulation panels such as plywood which supplements the insulation of the roof. Therefore, between each inner and outer side wall member, and between the top compartment panel and the roof, dead air spaces are provided which supplement the heat-retarding action of the plywood to prevent heat loss by conduction. Moreover, in the roof structure, the dead air spaces furnish the area for the relatively heavy roof beams, which are required to sustain the heavy weight load. In this manner, a conventional refrigeration unit of relatively small size may be utilized effectively to maintain the meat approximately at its storage temperature during transport in the vehicle.

The present suspension principle of crowding the meat to impede its motion also has the advantage of improving the transverse stability of the vehicle. Preferably, the hangers are sufficiently long to suspend the mass with its major load plane located as nearly as possible toward the floor of the vehicle to reduce as much as possible the effect of lateral forces which may be developed as the vehicle rounds a curve at high speed or in response to pitching and side-sway. Moreover, the crowded mass, in response to such forces, reacts against the lower portion of the walls which is best able to resist them, since the base of each wall is anchored to the chassis.

To interfit as compactly as possible, the irregularly shaped meat quarters, which taper outwardly from the upper shank to the lower rump portion, suspension hangers having diverse lengths preferably are utilized, to stagger the quarters vertically and thereby to nest the larger rump section between adjoining shank sections. Each hanger is generally S-shaped, having a curved upper bight or hook for anchorage upon the suspension rail and having a curved lower bight which includes a pointed end, adapting it to be thrust through the shank portion of the quarter to suspend it.

Another advantage of the invention resides in the use of a suspension rail having a convex upper surface matching the concave upper hook. The convex flange surface cams the hook to its fully engaged position as it initially is placed over the flange. Since the heavy quarters are lifted manually for engagement of the hooks with the rail, the camming action facilitates loading and prevents accidents.

Briefly therefore, the present structure eliminates practically all direct heat leakage; it utilizes the full cargo area and prevents changes in weight distribution by crowding the quarters and preventing them from sliding along the rails; and finally, it suspends the cargo at a low-slung plane for safety and stability.

Other features and advantages are brought out in greater detail in the specification with reference to the drawings.

In the drawings:

Figure 1 is a digrammatic perspective view of a trailer body equipped with the meat suspension structure of this invention.

Figure 2 is an enlarged fragmentary perspective view illustrating one of the overhead suspension rails with the hangers anchored on it and supporting the quarters of meat.

Figure 3 is an enlarged cross section, detailing the attachment of one of the suspension rails to the roof structure, the section being taken along line 3—3 of Figure 1.

Figure 4 is a longitudinal section of the trailer body further illustrating the arrangement of the suspension rails and the staggered relationship of the load lengthwise of the vehicle.

Figure 5 is a diagrammatic cross section illustrating the relationship of the load transversely of the vehicle.

Figure 6 is an enlarged sectional view taken from Figure 5, showing the suspension hangers being applied to the rail.

Figure 7 is a view similar to Figure 6, showing the hanger suspended in load supporting position from the rail.

GENERAL ARRANGEMENT

Figures 8, 9:
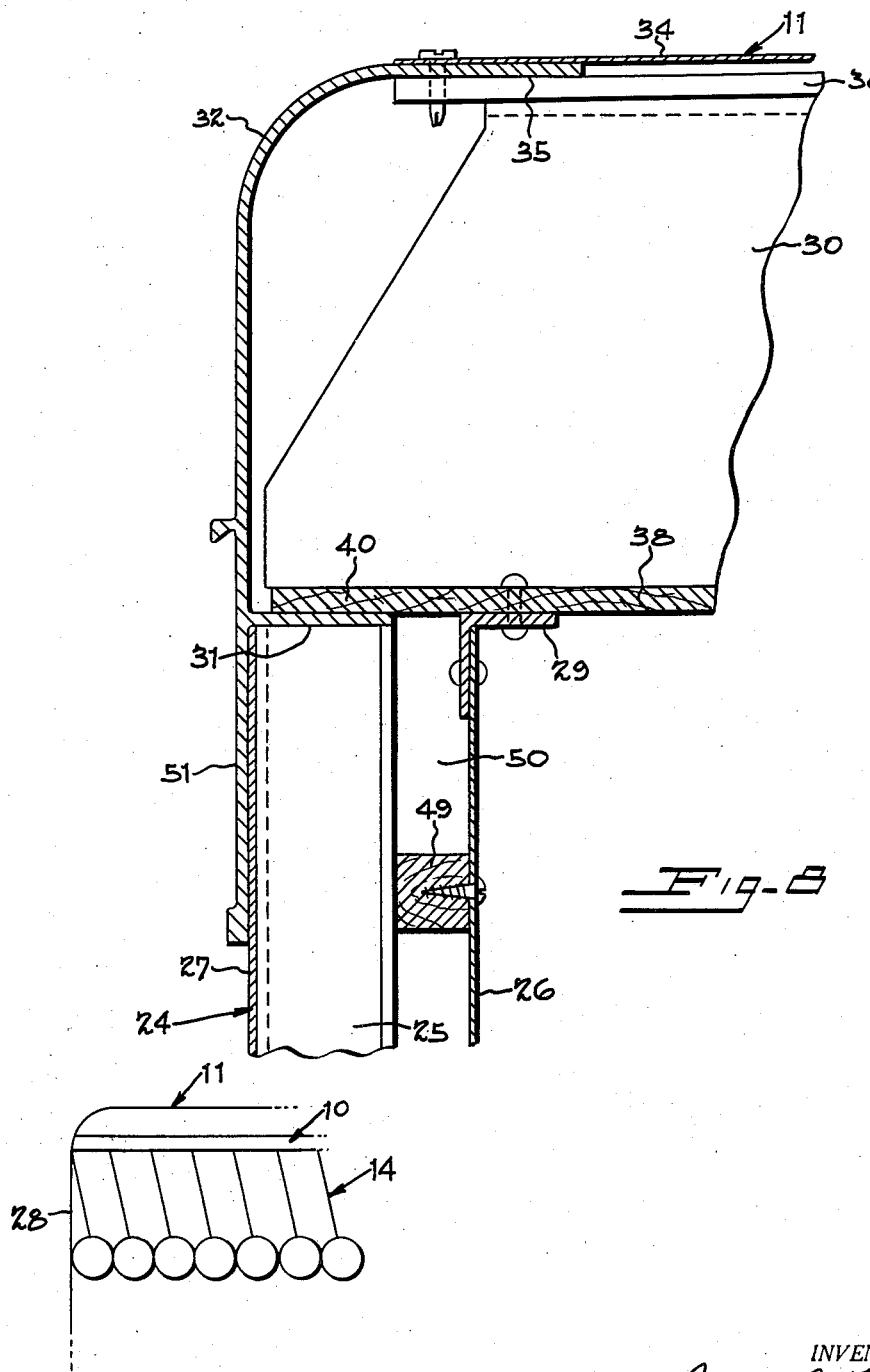
Figure 8 is an enlarged fragmentary cross sectional view of the upper portion of the wall and roof further detailing the structure.
Figure 9 is a diagram illustrating the principle of crowding the cargo to prevent cargo shift longitudinally of the vehicle.

Described generally with reference to Figure 1, the suspension rails 10 are attached to the roof structures 11 of the trailer body and extend longitudinally from the rearward door opening 12 to the forward end of the trailer. The suspension hangers are supplied, according to the present disclosure, in two different lengths, hanger 13 being approximately twice the length of hanger 14. The cargo is loaded from the rearward door opening, the meat sections 15 being hung from the rails starting at the forward end of the vehicle and progressing toward the rearward door opening. The cargo is naturally unloaded in the reverse order.

The meat sections shown in Figure 4 represent quarters of beef alternately suspended on long hangers 13 and short hangers 14, such that the quarters reside generally in two separate planes as viewed lengthwise of the vehicle. As viewed in Figure 5, the quarters are similarly suspended from alternate long and short hangers crosswise of the trailer.

The long and short hangers thus suspend the meat quarters in vertical staggered relationship throughout the entire cargo area, with the large rump end 16 of one quarter at least partially fitting between the shank portions 17—17 of the adjacent quarters. The interfitted quarters thus take full advantage of the available cargo space. It is to be noted at this point, that the packed and nested quarters, which are in partial contact with one another, have an interlocking action which inhibits relative movement; therefore, any lateral force reacting upon the cargo tends to shift it as an integrated mass. On the other hand, because of the irregular shape, spaces exist between the quarters to allow the circulation of cool air.

As shown diagrammatically in Figure 8, the quarters are crowded longitudinally of the vehicle compartments by selecting apertures which suspend each quarter against the one ahead of it such that they interfit to create a mass which resists longitudinal movement under inertia. Since each hanger is engaged in an aperture of the rail, there is no chance for the mass to slide along the rail and cause a change in weight distribution.

Since the large rump portions of the meat quarters reside in the lower zone of the trailer body, the major weight is located approximately in the plane indicated by the broken line 18 of Figure 5. Therefore, if the cargo mass tends to swing transversely against the side wall, the strain is imposed upon the lower portion of the wall which is best able to withstand the pressure. Because of its point of application, the lateral strain is resisted primarily by the undercarriage to which the base of each wall is attached and also is resisted at the top because of the connection between the roof and walls at opposite sides. The low-slung plane of the major cargo weight naturally has the further advantage of improving the stability of the vehicle by lowering its center of gravity.

It will be understood that the length of the hangers 13 and 14 depends upon the average length of the product to be hauled. In the present example, for suspending beef quarters, the long hangers 13 may be approximately twenty inches long and the short hangers 14 approximately ten inches long. This length is related to the ceiling height of trailer and the overall length of meat quarters to suspend them above the floor in the plane indicated above.

Structure

Described in greater detail, the trailer consists of a floor 20 which is supported upon the chassis or undercarriage 21 having wheels 22 at its rearward end, and a fifth wheel 23 at its forward end. The side walls 24 consist of spaced vertical load bearing studs 25 enclosed by inner panels 26 preferably of plywood and outer panels 27, preferably of sheet metal. The lower end portions of the wall posts are rigidly attached, in the usual way, to the chassis to resist transverse wall deflection.

The front wall 28 of the trailer is similar in construction to the side walls. The rearward door opening 12 is provided with the usual hinged doors including suitable latching mechanism (not shown).

The roof section 11 acts as a beam transmitting the suspended cargo load to the side walls. The wall studs or posts 25, which may consist of Z-sections, channels, or I-beam members, bear the load in compression and transmit it to the chassis. As indicated in Figures 3 and 7, the roof structure consists of a series of roof bows 30 spaced apart from one another and extending transversely across the side walls. Each bow is in the form of a deep channel, fabricated from sheet metal and acting as a beam which carries the load to the wall posts.

The opposite ends of each roof bow are supported upon respective flange sections 31 which are seated upon the top portion of the side walls. The flange sections are attached to the walls by screws (not shown) and support the ends of the roof bows 30, as explained later. The flange sections 31 form part of a curved cap rail or quarter panel 32 which connects the side walls to the roof section along opposite sides. The quarter panels preferably consist of extrusions and may be of aluminum or a similar material for lightness. The forward and rearward head rails 33 are of similar configuration and joint the quarter panels at the corners of the body.

A roof sheet 34 marginally overlies the inner edge portion 35 on each cap rail and is secured by screws (not shown). As best shown in Figure 1, a transverse insulating strip 36 of plywood or the like, extends along the top of each roof bow and supports the roof sheet. A slight transverse curvature is imparted to the roof sheet for drainage by a stringer 37 in the form of a wood strip extending lengthwise along the center line of the roof between the transverse strips 36 and upper surface of the roof bows. It is secured in place by the screws 39 (Figure 3).

The room section includes a ceiling 38 consisting of a heat insulating plywood panel secured by screws to the lower surface of the roof bows. The marginal edges of the panel are interposed between the roof bows 30 and flange sections 31 as at 40 (Figure 8) and thus prevent heat flow from the roof bows to the quarter panels. The suspension rails 10 reside against the lower surface of the ceiling panel 38 and are secured in position by screws 41. The screws pass upwardly through the ceiling panel and through the lower flange 42 of each roof bow (Figure 3) and thus attach both the panel and rails to the bows. The ceiling panel thus forms a heat barrier which prevents the direct flow of heat from the roof beams 30 to the meat rails 10 within the vehicle compartment.

Described with reference to Figure 2, the suspension rails are generally in the form of I-beams, each having a flat top flange 43, a vertical web 44, and a bottom flange 45 which has a transversely curved bearing surface 46. The curved surface 46 mates with the curved upper bight of the suspension hangers 13 and 14 as described in detail later. To permit engagement of suspension hooks, the vertical web 44 is provided with elongated openings 47 which are spaced apart from one another for the full length of the rail. The screws 41, which support the suspension rails, pass through the spaced holes 48 which are located along opposite side edge portions of the top flange.

It will be noted that the roof section so far described forms a bridge-like lattice structure extending transversely across the side walls. The deep cross section of the roof bows and their spacing create sufficient strength to support the weight load of the suspended cargo safely and without undue deflection under the shocks and vibration prevailing during road transport.

The flange section 31 of each quarter panel 32 includes a vertical flange which depends downwardly and resides against the outer panels of the side wall. The flange 51 is secured to the side wall by screws or the like (not shown). Since the cap rails extend for the full length of the body along opposite sides, the connection which it provides from the walls to the roof bows, strengthens the body against forces tending to produce side wall deflection. Insulating materials, as noted earlier, may be packed into the space between the ceiling and roof sheet.

It will be noted that the flange section 31 terminates short of the inner panel, leaving a gap 50 between the inner edge of the flange and the inner wall panel 26. The panel 26 has its upper edge attached to the ceiling panel 38 by means of an angle member 29. Wood furring strips 49 are interposed between the panels 26 and studs 25 as shown in Figure 8. This structure prevents direct heat flow from the wall structure to the quarter panel 32.

As best shown in Figures 6 and 7, each S-shaped suspension hanger 13 or 14 consists of a shank 52 formed of rod stock having an upper curved hook or bight 53 and a lower hook 54 formed as an integral part of the shank. Both hooks have approximately the same radius and both extend for approximately 180 degrees from the shank in opposite directions.

The inside radius of the hook is approximately equal to the radius of the curved surface 46 of the suspended rail to provide a complementary bearing surface when placed over the flange. The outer end of the lower hook is provided with a point 55 for piercing the shank portion of the quarter. The long and short hangers are similar except that the shank of hanger 13 is approximately twice as long as the shank of hanger 14.

During the loading operation, the hooks are applied to the shank end of each quarter by forcing the pointed end 55 through the quarter between the bone and tendon, as indicated in the drawings. The hangers may be inserted before loading and will remain in this position as the quarter is transferred from the loading area into the trailer. The quarters may be transported upon a hand truck or similar device or they may be carried manually. At the suspending point, each quarter is lifted upwardly bringing the curved hook 53 above the curved flange 45 and through the selected hook opening 47 as shown in Figure 6. The quarter is then lowered to bring the upper hook downwardly. In the event that the upper hook is not in line with the curved flange, the surface 46 creates a lateral camming action against the blunt end 56 to shift the hook laterally into alignment and in nested, line bearing engagement as indicated in Figure 7.

As indicated in Figure 4, the hook openings 47 of the suspension rails are located on fairly close centers. In loading fairly large beef quarters, they are located relative to one another by selecting an aperture which will suspend the quarter at least partially nested with the adjoining ones and leaning against them, usually skipping one or two apertures for the required position. Thus, the quarters are hung as closely as possible in compact, contiguous positions so that they crowd one another.

This effect is illustrated diagrammatically in Figure 9. Suppose each section of beef to be suspended is represented as a ball on the end of a string. If the strings are attached to a rail at points which are spaced apart distances equal to the ball diameters, them each ball will hang free, and should a vehicle from which the balls are suspended in such manner be stopped suddenly, then all of the balls will swing forwardly in unison, thereby exerting a force on the rail tending to pull it forwardly. However, if the strings are attached to the rail at distances spaced apart less than the ball diameters or thicknesses, then the balls relatively will crowd against one another, and if the balls are of irregular shape as are the sides or quarters of meat, then the masses will tend to interfit, thereby minimizing the inertial movements of the entire mass as caused by stopping and starting of a vehicle carrying the rail.

Experiences to date with structures built in accordance with the present invention have demonstrated the fact that the pay load which a trailer vehicle is capable of carrying can be increased by as much as ten to fifteen percent by the utilization of this principle, without in any way physically impairing the meat or endangering safe operation of the vehicle.

The vehicle may be cooled either by a power-driven refrigeration unit or it may be packed with Dry Ice according to standard practice. The refrigerating unit has also been omitted from the drawings. It will be understood that products other than meat may be shipped, following the suspension principle of this invention. In practically all cases, by using proper hanger lengths, it is possible to located the load mass in the lower portion of the body.

Having described my invention, I claim:

1. A suspension structure for suspending cargo units in a vehicle body having an undercarriage and sidewall members secured to the chassis and rising upwardly from opposite sides thereof, said undercariage and sidewall members being formed of metal, said suspension structure comprising metallic roof beams spaced apart from one another and extending across said side wall members, said roof beams having opposite end portions in load bearing engagement upon the side wall members, nonmetallic heat insulating means interposed between the side wall members and the said end portions of the roof beams, said heat insulating means transmitting the weight load of the roof beams in compression to the sidewall members, a plurality of metallic suspension rails spaced apart from one another and extending at right angles to the roof beams beneath the roof beams, means attaching the suspension rails to the roof beams, and non-metallic heat insulating means interposed between the roof beams and suspension rails, said suspension rails having spaced apertures therein for engaging and suspending said cargo units from the suspension rails, thereby to maintain the original weight distribution of the cargo while the vehicle is in transit, said heat insulating means substantially eliminating the conduction of heat through the roof beams and suspension rails to the cargo units in the vehicle body.

2. A suspension structure for suspending cargo units in a vehicle body having an undercarriage and having side wall members secured to the chassis and rising upwardly from opposite sides thereof, said suspension structure comprising a plurality of roof beams extending across the side wall members in spaced relationship to one another, a heat insulating ceiling panel bridging the side wall members and having opposite marginal edges resting upon the upper edges of the sidewall members, said roof beams having opposite end portions in load bearing engagement upon the said marginal edges of the ceiling panel, a plurality of suspension rails extending longitudinally of the vehicle and spaced apart from one another, said suspension rails residing below the ceiling panel and secured to the roof beams in insulated relationship, said suspension rails having spaced apertures therein for engaging and suspending said cargo units from the suspension rails with the weight load thereof transmitted in compression through the marginal edges of the ceiling panel to the side wall members, said apertures maintaining the cargo units in fixed position relative to the suspension rails, said heat insulating ceiling panel substantially eliminating the flow of heat from the cargo units through the suspension structure.

3. A suspension structure for suspending cargo units in a vehicle body having an undercarriage and having a pair of vertical load bearing side wall members secured to said chassis and rising upwardly from opposite sides thereof, said suspension structure comprising roof bows spaced apart from one another and extending across the chassis, said roof bows having opposite ends in load bearing engagement upon the upper ends of the side wall members, a heat insulating ceiling panel secured to the under surface of said roof bows and having marginal edges interposed between the upper ends of the side wall members and the end portions of the roof bows, whereby the roof bows form load bearing beams transmitting their weight load through the said marginal edges of the ceiling panel to the side wall members with the panel forming a heat barrier therebetween, a plurality of load suspension rails extending lengthwise of the body at right angles to said roof bows, said suspension rails residing against the lower surface of said ceiling panel, means anchoring the suspension rails to the roof bows with the ceiling panel providing a heat barrier between the suspension rails and roof bows, said suspension rails including a series of apertures spaced apart from one another for engaging and suspending said cargo units from the suspension rails, said apertures anchoring the cargo units in spaced relationship and against longitudinal movement along the rails, said plurality of roof bows and suspension rails in right angular relationship providing a lattice structure wherein said members mutually distribute the weight load of the suspended cargo units longitudinally and transversely and transmit the weight load in compression to side walls, said heat insulating ceiling panel substantially eliminating the flow of heat from the cargo units through the suspension structure.

4. A suspension structure for suspending cargo units in a vehicle body having a chassis, a pair of side walls and a forward end wall mounted on the chassis, and a roof structure secured to the upper portion of the side walls, said cargo suspension structure comprising, a plurality of suspension rails secured to the roof structure and extending longitudinally thereof, each of said suspension rails having spaced apertures therein, a plurality of hangers having lower ends attached to the cargo units, each of said hangers having a hook portion at the upper end thereof anchored through the aperture of the suspension rails, said hangers suspending the cargo units with the weight load thereof carried by the roof structure and transmitted in compression to the side walls and end wall, said hangers having a length to suspend the cargo units collectively in a plane of gravity located below the middle plane of the vertical walls, said apertures being spaced to suspend the cargo units as a crowded mass with the hooks of the hangers located forwardly of the cargo units thereof, whereby the weight load of the suspended mass is imposed partially upon the forward wall of the vehicle body and resisted by the chassis and roof structure at the lower and upper portions of the said walls.

5. A suspension structure for suspending cargo units in a vehicle body having a chassis, a pair of side walls and a forward end wall mounted on the chassis, and a roof structure secured to the upper portion of the side walls, said cargo suspension structure comprising, a plurality of suspension rails secured to the roof structure and extending longitudinally thereof, each of said suspension rails having spaced apertures therein, a plurality of hangers having lower ends attached to the cargo units, each of said hangers having a hook portion at the upper end thereof anchored through the apertures of the suspension rails, said hangers suspending the cargo units with the weight load thereof carried by the roof structure and transmitted in compression to the side walls and end wall, said hangers having a length to suspend the cargo units collectively in a plane of gravity located below the middle plane of the vertical side walls, whereby the cargo units engage the side walls and forward end wall substantially along th esaid plane of gravity, said apertures being spaced to suspend the cargo units in a crowded mass with the hooks of the hangers located forwardly of the cargo units which they suspend, whereby the cargo units are swung forwardly against one another and against said forward end wall substantially along said plane of gravity, the horizontal forces acting upon said mass being transmitted to the side walls and forward end wall and resisted by the chassis and roof structure at the lower and upper portions of the walls.

6. A suspension structure for suspending cargo units in a vehicle body having a chassis, a pair of side walls and a forward end wall mounted on said chassis, and a roof structure secured to the upper portions of the side walls, said cargo suspension structure comprising, a plurality of suspension rails secured to the roof structure and extending longitudinally thereof, said suspension rails including a load bearing flange along the lower edge thereof, said flange having a transversely curved upper bearing surface, a plurality of cargo hangers, each of said hangers having a curved hook on its upper end and means on its lower end engaging a cargo unit, said curved hook having an inside radius complementary to the curved upper surface of said flange, the curved surface of the flange providing a camming action which guides the curved hook into nested engagement over said curved bearing surface upon engagement of the free end of the hook downwardly upon said curved bearing surface, said hangers having a length which suspends the cargo units generally in a load plane which is below the middle plane of the sidewalls whereby, in response to forces acting horizontally thereon, the cargo units engage said walls along said load plane, the pressure of said cargo units being transmitted from the said walls and resisted by the roof structure and chassis with substantially no lateral deflection of the side walls.

7. A cargo suspension structure for a vehicle body having a chassis, a pair of side walls and a front wall mounted on the chassis, and a roof structure secured to the upper portion of the side walls, said suspension structure comprising, a plurality of suspension members secured to the roof structure, said suspension members extending longitudinally and having a plurality of openings therein, a plurality of hangers having lower ends attached to the cargo units, said hangers each having a hook portion at the upper end thereof detachably anchored in the openings of the suspension members and supporting the cargo units with the weight load thereof carried by the roof structure and transmitted in compression to the side walls, said hangers having diverse lengths thereby suspending the cargo units in vertically staggered relationship with the cargo units nested compactly with one another and forming an integrated mass extending transversely from wall to wall, the diverse lengths of the hangers being related to the distance between the chassis and roof structure to dispose the major load plane of the said staggered mass generally in a plane intermediate the roof structure and chassis, whereby upon movement of said mass laterally, the lateral pressure of said mass is imposed upon the side walls along the said intermediate plane and is resisted by the chassis and roof structure to which the side walls are secured, the chassis and roof structure thereby coacting to control lateral deflection of the side walls, the openings of the suspension members being spaced apart longitudinally and suspending the cargo units with the said hooks located forwardly, the weight load of the suspended mass being imposed partially against the front wall of the vehicle body.

8. A cargo suspension structure for a vehicle body having a chassis and a pair of vertical load bearing side walls rigidly secured to said chassis, said cargo suspension structure comprising, a series of roof bows extending across the chassis and having opposite ends secured to the side walls, heat insulating means interposed between the side walls and the ends of the roof bows which are secured thereto, each of said roof bows having a channel-shaped cross section providing a lower horizontal flange, a plurality of load suspension rails extending lengthwise of the body and at right angles to said roof bows, each of said rails having an I-beam cross section providing a top flange, a vertical web and a load support flange along the lower edge of the web, each of said top flanges being rigidly attached to the lower horizontal flanges of the roof bows, heat insulating means interposed between the said attached flanges of the load suspension rails and roof bows, the vertical webs of the rails each including a series of openings spaced apart from one another, a series of cargo hangers, each hanger having a hook at its upper end and cargo engaging means at its lower end, said upper hooks passing through the hook openings of said web and engaging the lower flange of the suspension rail, said rails transmitting the weight load of the suspended cargo units collectively to the roof bows, the roof bows transmitting the load in compression through the insulating means residing between the ends of the roof bows to the side walls and being transmitted from the side walls to the chassis, said hangers suspending the cargo units with the major weight load thereof generally located in a load plane intermediate the vertical extent of the side walls, whereby lateral forces acting on the suspended cargo and tending to shift the same laterally is imposed upon the side walls along said load plane, the chassis and roof structure resisting lateral deflection of the side walls at the top and bottom portions thereof.

9. In a vehicle for transporting a suspended cargo, said vehicle having a chassis, a pair of side walls, and a front wall, said walls including vertical load bearing members secured rigidly to the chassis and rising from opposite sides thereof, an overhead beam structure residing above the chassis and having opposite ends secured rigidly to the upper portions of the vertical load bearing members, said overhead beam structure including longitudinal suspension members extending longitudinally of the vehicle, said suspension members each including spaced openings, a plurality of cargo hangers, each of said hangers having a lower end secured to an individual unit of cargo, each of said hangers having connector means at its upper end anchored in the spaced openings of the longitudinal suspension members and suspending the individual units of cargo above the chassis in a load plane located below the middle plane of the vertical load bearing members, whereby the lateral pressure of the collective cargo units in response to lateral forces is transmitted to the vertical load bearing members and is absorbed by the overhead beam structure and by the chassis, the pressure absorbed by the chassis being greater than that absorbed by the beam structure in a proportion determined by the location of the load plane below the said middle plane, said openings of the suspension members being spaced to suspend the cargo units as a mass with the connector meas of the hooks located forwardly of the cargo units thereof, the weight load of the suspended mass being imposed partially upon the front wall of the vehicle body.

References Cited in the file of this patent

UNITED STATES PATENTS

| | | |
|---|---|---|
| 168,953 | Acklom | Oct. 19, 1875 |
| 1,294,457 | Hawk | Feb. 18, 1919 |
| 2,578,052 | Evanoff et al. | Dec. 11, 1951 |
| 2,590,533 | Hamer | Mar. 25, 1952 |
| 2,657,088 | Clement | Oct. 27, 1953 |

FOREIGN PATENTS

| | | |
|---|---|---|
| 680,316 | Great Britain | Oct. 1, 1952 |